United States Patent
Fukui

(10) Patent No.: US 7,286,459 B2
(45) Date of Patent: Oct. 23, 2007

(54) OPTICAL DISC REPRODUCTION APPARATUS DETERMINING WHETHER OPTICAL DISC TO BE REPRODUCED IS READ-ONLY OR RECORDABLE

(75) Inventor: Toshiaki Fukui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 582 days.

(21) Appl. No.: 10/915,758

(22) Filed: Aug. 11, 2004

(65) Prior Publication Data

US 2005/0036416 A1    Feb. 17, 2005

(30) Foreign Application Priority Data

Aug. 13, 2003   (JP)   ............... 2003-292936

(51) Int. Cl.
  *G11B 7/00* (2006.01)
(52) U.S. Cl. .................................... 369/53.2
(58) Field of Classification Search ............... None
  See application file for complete search history.

(56) References Cited

U.S. PATENT DOCUMENTS

| | | | | |
|---|---|---|---|---|
| 5,175,719 A | * | 12/1992 | Iimura ..................... | 369/44.29 |
| 5,297,113 A | * | 3/1994 | Hikima et al. ........... | 369/44.28 |
| 6,005,832 A | * | 12/1999 | Kumagai ................. | 369/53.23 |
| 6,028,826 A | * | 2/2000 | Yamamoto et al. ...... | 369/44.35 |
| 6,868,051 B2 | * | 3/2005 | Ogihara .................. | 369/53.2 |
| 7,123,574 B2 | * | 10/2006 | Shoji et al. .............. | 369/53.2 |
| 2003/0123358 A1 | * | 7/2003 | Kanda et al. ............ | 369/53.22 |

FOREIGN PATENT DOCUMENTS

| | | |
|---|---|---|
| JP | 2000-182314 | 6/2000 |
| JP | 2002-190114 | 7/2002 |
| JP | 2002-367168 | 12/2002 |
| JP | 2003-016641 | 1/2003 |
| JP | 2003-242641 | 8/2003 |

OTHER PUBLICATIONS

Patent Abstracts of Japan, Publication No. 2000-182314 dated Jun. 30, 2000, 1 pg.
Patent Abstracts of Japan, Publication No. 2002-190114 dated Jul. 5, 2002, 1 pg.
Patent Abstracts of Japan, Publication No. 2002-367168 dated Dec. 20, 2002, 1 pg.
Notice of Ground of Rejection, mailed Jan. 24, 2006, Patent Application No. 2003/292936, with English translation (5 pages).
Patent Abstracts of Japan, Application No. 2003-242641, dated Aug. 29, 2003 (1 page).
Patent Abstracts of Japan, Application No. 2003-016641, dated Jan. 17, 2003 (1 page).

* cited by examiner

*Primary Examiner*—William R. Korzuch
*Assistant Examiner*—Peter Vincent Agustin
(74) *Attorney, Agent, or Firm*—Osha Liang LLP

(57) ABSTRACT

A bandpass filter receives a tracking error signal. An average/minimum frequency measurement circuit repeats measurement prescribed times, of an average frequency and a minimum frequency of a signal output from the bandpass filter. A standard deviation calculation circuit assumes the average frequency and the minimum frequency obtained by prescribed times of measurement as one variate, and calculates a standard deviation of this variate. A determination circuit determines an optical disc to be reproduced as a read-only optical disc when the standard deviation is equal to or larger than a prescribed value, while it determines the optical disc to be reproduced as a recordable optical disc when the standard deviation is smaller than the prescribed value.

3 Claims, 5 Drawing Sheets

OPTICAL DISC REPRODUCTION APPARATUS DETERMINING WHETHER OPTICAL DISC TO BE REPRODUCED IS READ-ONLY OR RECORDABLE

BACKGROUND OF THE INVENTION

1. Field of the Invention

The present invention relates to an optical disc reproduction apparatus, and more particularly to an optical disc reproduction apparatus attaining a function to determine whether an optical disc to be reproduced is a read-only optical disc or a recordable optical disc.

2. Description of the Background Art

Types of optical discs include read-only optical discs such as a CD-ROM or a DVD-ROM and recordable optical discs such as a CD-R, a CD-RW, a DVD-R, or a DVD-ROM.

A recordable optical disc has a meandered wobble formed on a circumference in order to maintain its linear velocity constant during reproduction and recording. In the recordable optical disc, as tracking is carried out using the wobble, a signal having a frequency in accordance with a shape of the wobble is superposed on a tracking error signal. The superposed signal is referred to as a wobble signal.

Depending on whether or not the wobble signal is superposed on a tracking signal, whether the optical disc to be reproduced is either a read-only optical disc or a recordable optical disc can be determined. If the optical disc to be reproduced is determined as the recordable optical disc, reproduction of specific contents is disabled. That is, reproduction of the specific contents that have illegally been copied can be avoided.

Japanese Patent Laying-Open No. 2000-182314 discloses a method of determining whether or not a wobble signal is superposed on a tracking error signal. In other words, in Japanese Patent Laying-Open No. 2000-182314, whether or not the wobble signal is superposed is determined with a method noting a zero crossing point as discussed below.

In Japanese Patent Laying-Open No. 2000-182314, a zero crossing point of a tracking error signal is detected so as to calculate a time interval between the zero crossing points. When a difference D between the time intervals is equal to or larger than a prescribed value, a count value is incremented. Then, after a prescribed time has passed, whether the count value is not smaller than the prescribed value is determined. If the count value is not smaller than the prescribed value, it is likely that difference D between the time intervals is equal to or larger than the prescribed value, and therefore, it is determined that the wobble signal is superposed.

On the other hand, with the method of determining whether or not the wobble signal is superposed on the optical disc using the time interval between the zero crossing points as disclosed in Japanese Patent Laying-Open No. 2000-182314, presence/absence of the wobble signal cannot be determined with high accuracy when a large amount of noise component is superposed on the tracking error signal.

SUMMARY OF THE INVENTION

Accordingly, an object of the present invention is to provide an optical disc reproduction apparatus capable of determining with high accuracy whether an optical disc to be reproduced is a read-only optical disc or a recordable optical disc even when a large amount of noise component is superposed on a tracking signal.

An optical disc reproduction apparatus according to one aspect of the present invention determines whether an optical disc to be reproduced is a recordable optical disc having wobble formed or a read-only optical disc without wobble being formed. The optical disc reproduction apparatus includes: a bandpass filter receiving a tracking error signal; a measurement circuit measuring an average frequency and a minimum frequency of a signal output from the bandpass filter; and a first circuit determining whether the optical disc to be reproduced is a recordable optical disc or a read-only optical disc, based on the measured average frequency and minimum frequency.

Preferably, the measurement circuit measures an average frequency and a minimum frequency within a prescribed time period, of the signal output from the bandpass filter. The first circuit includes an operation circuit operating the measured average frequency and the minimum frequency, and a determination circuit determining whether the optical disc to be reproduced is a recordable optical disc or a read-only optical disc, based on a result of the operation.

More preferably, the operation circuit subtracts the measured minimum frequency from the measured average frequency so as to obtain a subtraction value. The determination circuit determines the optical disc to be reproduced as a read-only optical disc when the subtraction value is not smaller than a prescribed value, and determines the optical disc to be reproduced as a recordable optical disc when the subtraction value is smaller than the prescribed value.

Preferably, the measurement circuit repeats measurement prescribed times, of an average frequency and a minimum frequency of the signal output from the bandpass filter. The first circuit includes: a subtraction circuit specifying an average frequency attaining a highest count among the average frequencies obtained by prescribed times of measurement and a minimum frequency attaining a highest count among the minimum frequencies obtained by prescribed times of measurement, and subtracting the minimum frequency attaining the highest count from the average frequency attaining the highest count so as to calculate a subtraction value; and a determination circuit determining the optical disc to be reproduced as a read-only optical disc when the subtraction value is not smaller than a prescribed value, and determining the optical disc to be reproduced as a recordable optical disc when the subtraction value is smaller than the prescribed value.

An optical disc reproduction apparatus according to another aspect of the present invention determines whether an optical disc to be reproduced is a recordable optical disc having wobble formed or a read-only optical disc without wobble being formed. The optical disc reproduction apparatus includes: a bandpass filter receiving a tracking error signal; a measurement circuit repeating measurement prescribed times, of an average frequency and a minimum frequency of a signal output from the bandpass filter; an operation circuit assuming the average frequency and the minimum frequency obtained by prescribed times of measurement as one variate and calculating a standard deviation of the variate; and a determination circuit determining the optical disc to be reproduced as a read-only optical disc when the standard deviation is not smaller than a prescribed value, and determining the optical disc to be reproduced as a recordable optical disc when the standard deviation is smaller than the prescribed value.

According to the present invention, even when a large amount of noise component is superposed on the tracking signal, whether the optical disc to be reproduced is the read-only optical disc or the recordable optical disc can be determined with high accuracy.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described with reference to the figures.

FIRST EMBODIMENT

Figure 1:
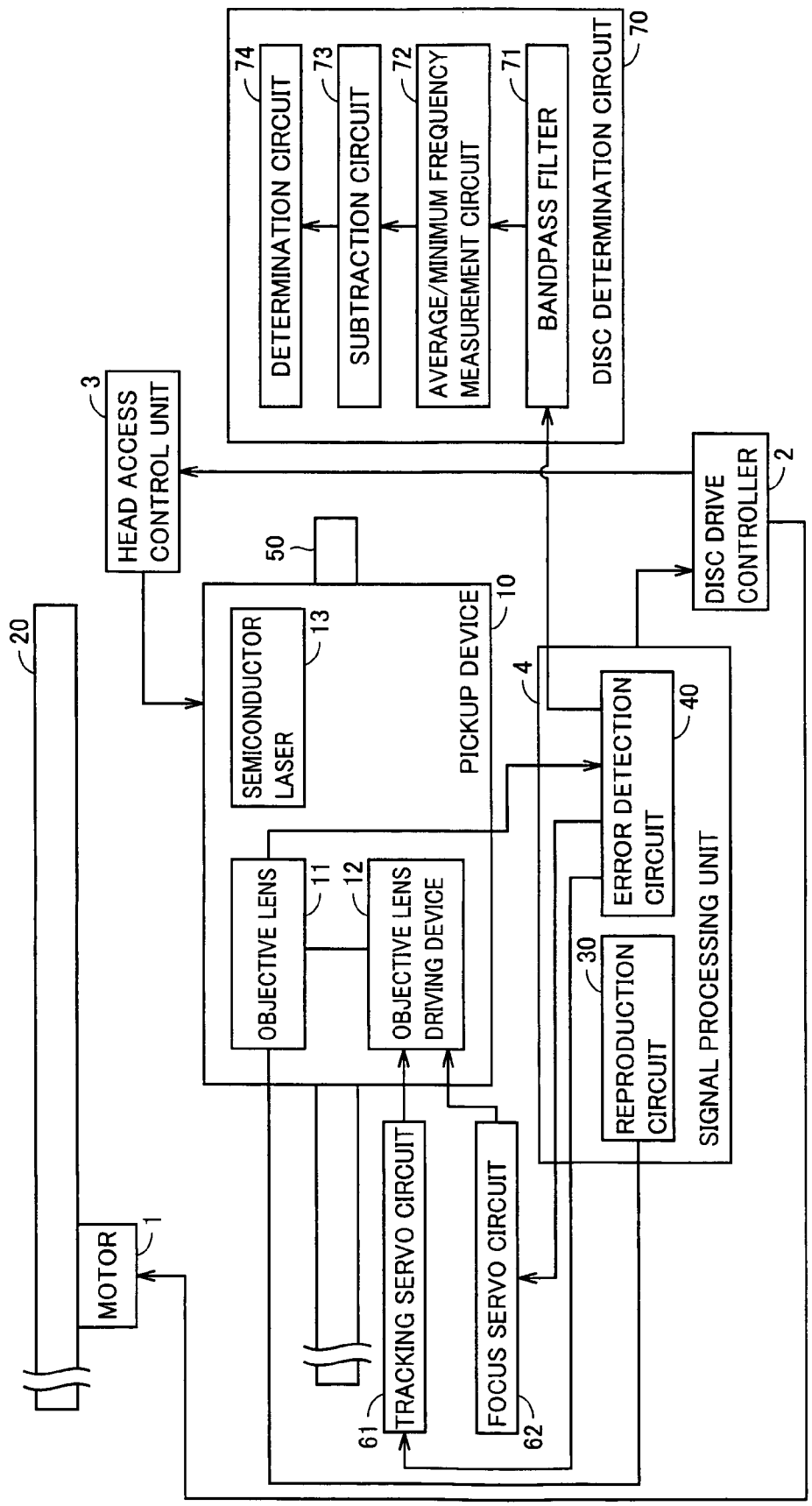
FIG. 1 schematically shows a configuration of an optical disc reproduction apparatus according to a first embodiment of the present invention.

FIG. 1 schematically shows a configuration of an optical disc reproduction apparatus according to a first embodiment of the present invention. Referring to FIG. 1, the optical disc reproduction apparatus includes a motor 1, a disc drive controller 2, a head access control unit 3, a guide 50, a pickup device 10, a signal processing unit 4, a tracking servo circuit 61, a focus servo circuit 62, and a disc determination circuit 70.

Motor 1 causes an optical disc 20 to rotate with a prescribed number of revolutions upon receiving a control signal from disc drive controller 2.

Pickup device 10 is driven by head access control unit 3 in a radial direction of optical disc 20 along guide 50. Pickup device 10 includes semiconductor laser 13 serving as a light source, an objective lens 11 collecting a laser beam output from semiconductor laser 13 on a recording surface of optical disc 20 and also receiving reflected light from the recording surface, and an objective lens driving device 12 driving objective lens 11.

Objective lens driving device 12 includes a magnet and a coil. Objective lens driving device 12 drives objective lens 11 in a focus direction by feeding a current to a focus coil placed in a magnetic field applied from the magnet, under the control of focus servo circuit 62. In addition, objective lens driving device 12 drives objective lens 11 in a tracking direction by feeding a current to a tracking coil placed in a magnetic field applied from the magnet, under the control of tracking servo circuit 61.

Signal processing unit 4 includes a reproduction circuit 30 and an error detection circuit 40.

Reproduction circuit 30 detects the reflected light incident on objective lens 11 and generates a reproduction signal representing data recorded on the recording surface.

Error detection circuit 40 detects displacement in a tracking direction (displacement in a radial direction of the optical disc) as well as displacement in a focus direction (displacement of an optical axis of the laser beam) of an objective lens holder based on a signal representing the reflected light incident on the objective lens, and generates a tracking error signal and a focus error signal based on detected displacement.

Tracking servo circuit 61 controls tracking of objective lens 11 by objective lens driving device 12 in accordance with the tracking error signal. Tracking servo circuit 61 applies tracking control in determining a type of an optical disc to be reproduced after it is inserted (tracking servo on).

Focus servo circuit 62 controls focusing of objective lens 11 by objective lens driving device 12 in accordance with the focus error signal.

Disc determination circuit 70 includes a bandpass filter 71, an average/minimum frequency measurement circuit 72, a subtraction circuit 73, and a determination circuit 74. Disc determination circuit 70 determines whether the optical disc to be reproduced is a read-only optical disc or a recordable optical disc while tracking servo is on.

Bandpass filter 71 passes a frequency component in a prescribed band of the tracking signal output from error detection circuit 40. The prescribed band is set around the frequency of the wobble signal.

Figure 2A:
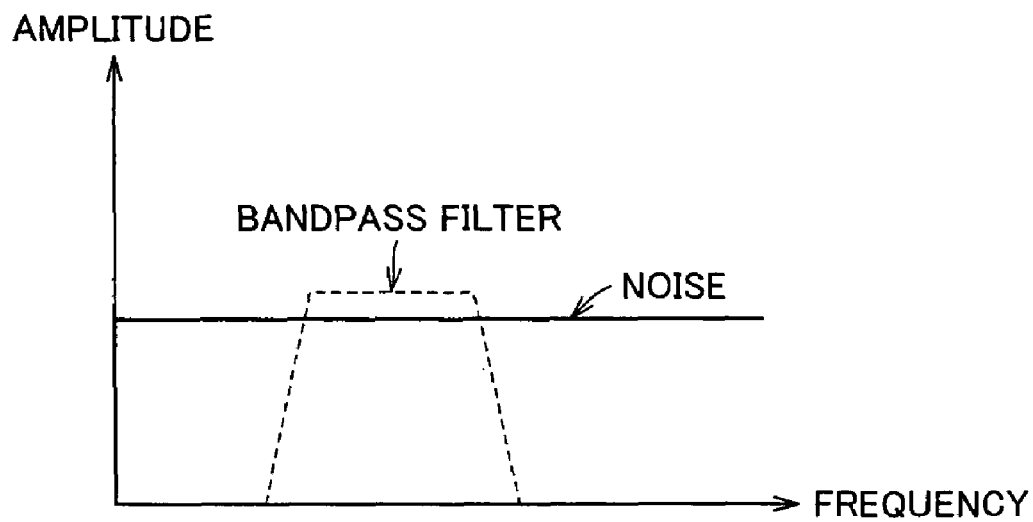
FIG. 2A shows a spectrum of a tracking signal when an optical disc to be reproduced is a read-only optical disc.
Figure 2B:
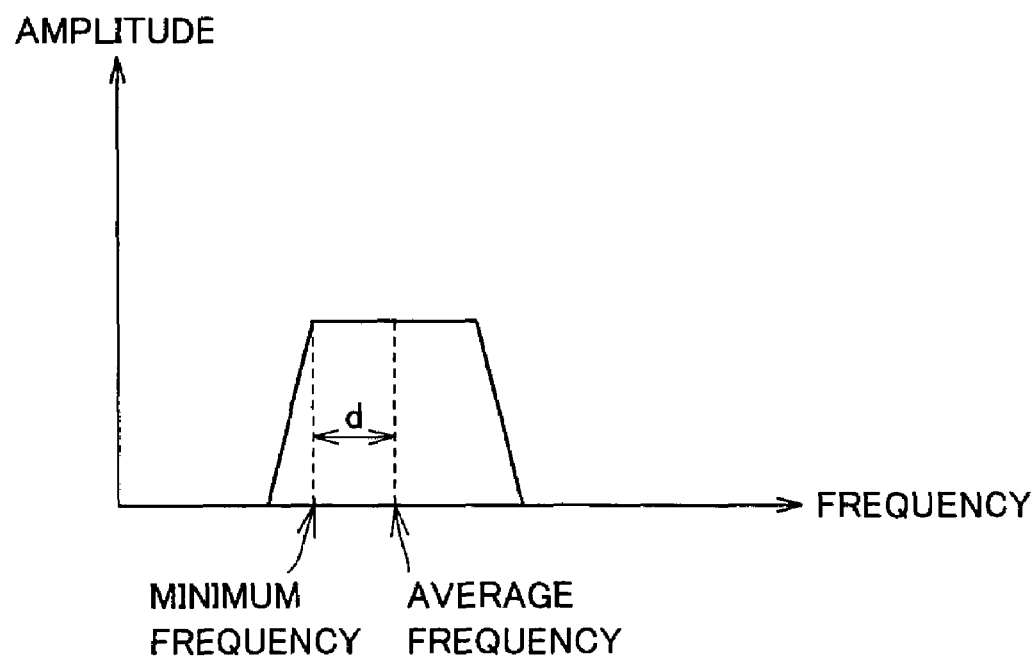
FIG. 2B shows a spectrum of an output signal from a bandpass filter 71 when the optical disc to be reproduced is a read-only optical disc.

FIG. 2A shows a spectrum of a tracking signal when the optical disc to be reproduced is a read-only optical disc, while FIG. 2B shows a spectrum of an output signal from bandpass filter 71 when the optical disc to be reproduced is a read-only optical disc. As shown in these figures, a pass band of bandpass filter 71 is set around the frequency of the wobble signal. Therefore, a frequency component close to the frequency of the wobble signal is extracted.

Figure 3A:
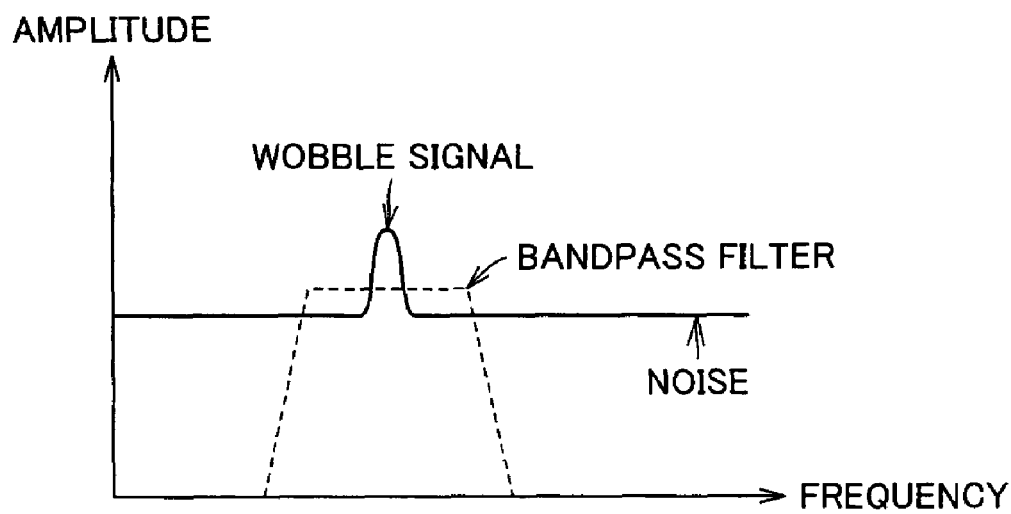
FIG. 3A shows a spectrum of the tracking signal when the optical disc to be reproduced is a recordable optical disc.
Figure 3B:
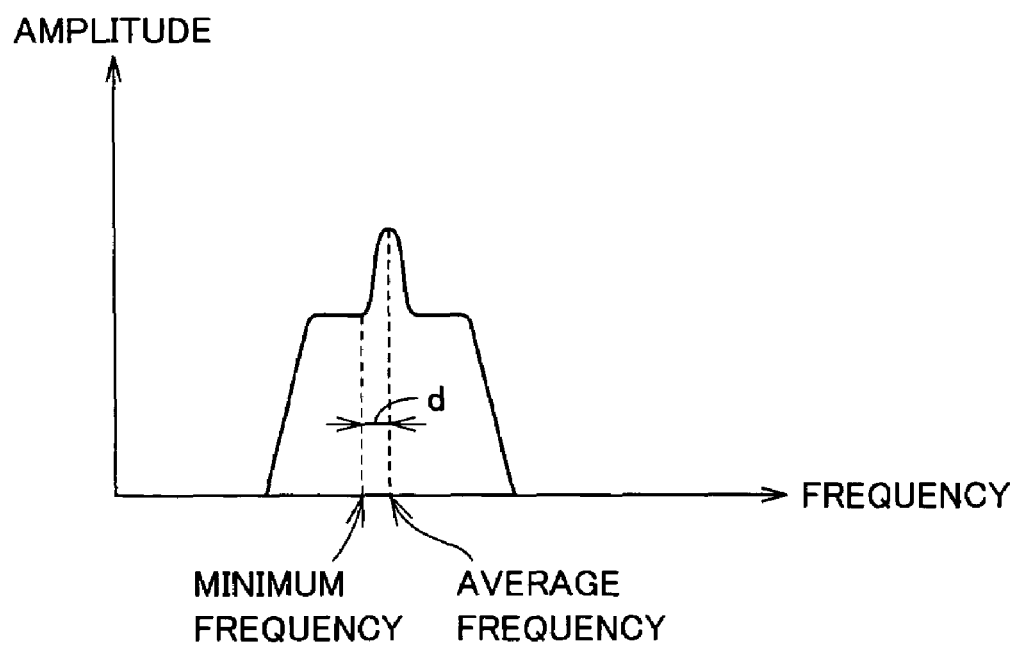
FIG. 3B shows a spectrum of the output signal from bandpass filter 71 when the optical disc to be reproduced is a recordable optical disc.

FIG. 3A shows a spectrum of the tracking signal when the optical disc to be reproduced is a recordable optical disc, while FIG. 3B shows a spectrum of the output signal from bandpass filter 71 when the optical disc to be reproduced is a recordable optical disc. As shown in these figures, the wobble signal is superposed on noise. Therefore, amplitude around the frequency of the wobble signal is large.

Average/minimum frequency measurement circuit 72 measures the average frequency and the minimum frequency of a signal that has passed through bandpass filter 71 in the following manner. Average/minimum frequency measurement circuit 72 samples signals that have passed through bandpass filter 71 over a prescribed section. Then, if a value of the sampled signal is equal to or larger than a reference value B, it is assumed as "1". On the other hand, if the value thereof is smaller than reference value B, it is assumed as "0". Namely, the sampled signals are binarized. Average/minimum frequency measurement circuit 72 counts the number of obtained "1"s and divides the count by the number of samples. Here, the resultant value is considered as the frequency of that section. Average/minimum frequency measurement circuit 72 repeats frequency measurement with respect to a plurality of sections, so as to obtain a plurality of frequencies. Average/minimum frequency measurement circuit 72 calculates an average of the plurality of frequencies so as to obtain an average frequency. In addition, average/minimum frequency measurement circuit 72 specifies a minimum value among the plurality of frequencies so as to obtain a minimum frequency.

FIGS. 2B and 3B show the average frequency and the minimum frequency measured as described above. As shown in these figures, a value d=(average frequency−minimum frequency) is larger in the read-only optical disc than in the recordable optical disc.

Subtraction circuit 73 subtracts the measured minimum frequency from the measured average frequency, and outputs a result of subtraction (subtraction value) d.

Determination circuit 74 determines the optical disc to be reproduced as the read-only optical disc when subtraction value d is equal to or larger than a prescribed value. On the other hand, when subtraction value d is smaller than the prescribed value, determination circuit 74 determines the optical disc to be reproduced as the recordable optical disc.

As described above, according to the optical disc reproduction apparatus in the present embodiment, even when a large amount of noise component is superposed on the tracking signal, whether the optical disc to be reproduced is the read-only optical disc or the recordable optical disc can be determined with high accuracy by using the difference between the average frequency and the minimum frequency of the output signal from the bandpass filter.

SECOND EMBODIMENT

Figure 4:
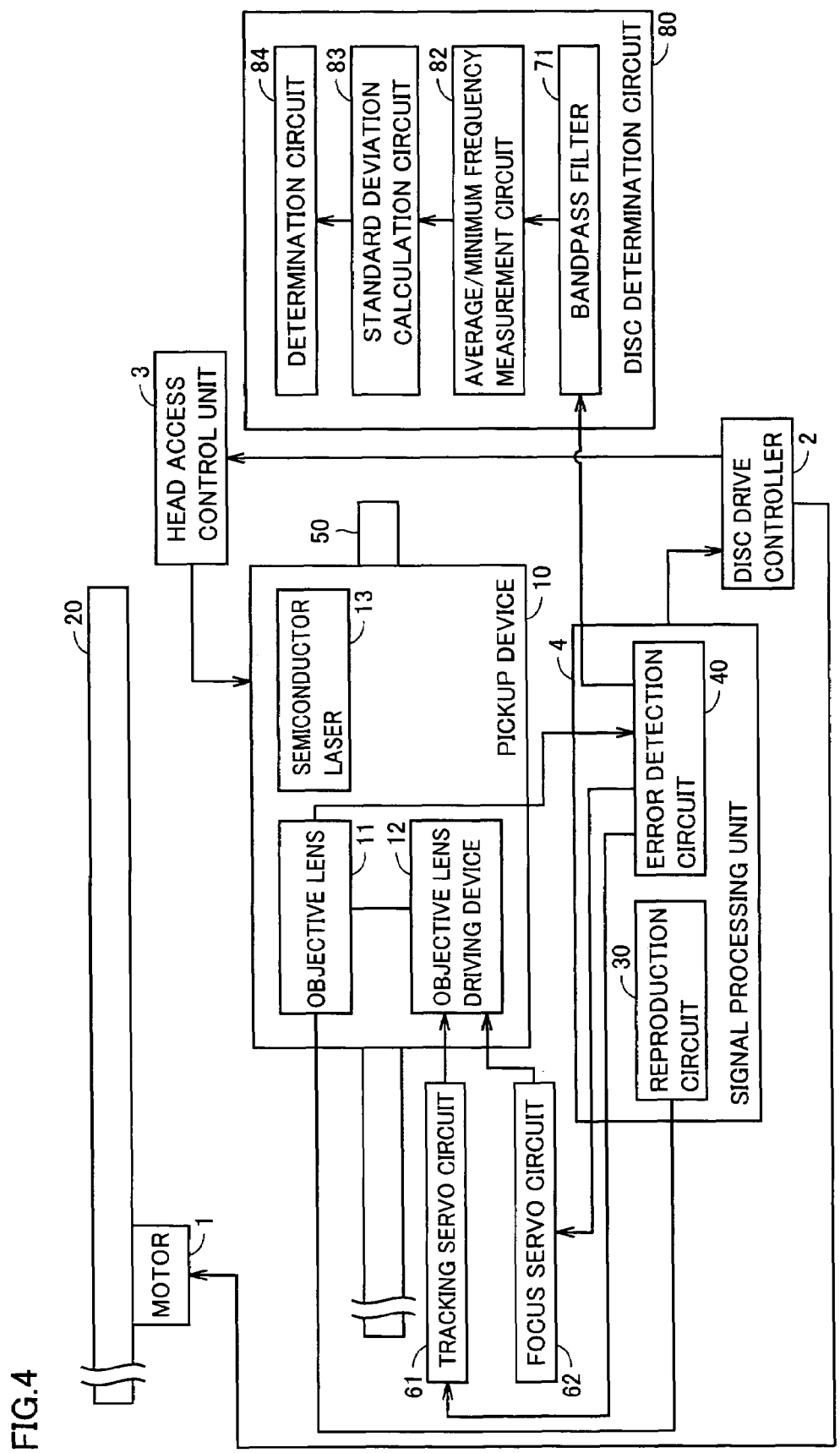
FIG. 4 schematically shows a configuration of an optical disc reproduction apparatus according to a second embodiment of the present invention.

FIG. 4 schematically shows a configuration of an optical disc reproduction apparatus according to a second embodiment of the present invention. In the figures, the same reference characters refer to the same components of the optical disc reproduction apparatus in both first and second embodiments. Referring to FIG. 4, the optical disc reproduction apparatus is different from that in the first embodiment in a disc determination circuit 80. In the following, description of disc determination circuit 80 will be provided.

Disc determination circuit 80 includes bandpass filter 71, an average/minimum frequency measurement circuit 82, a standard deviation calculation circuit 83, and a determination circuit 84. Bandpass filter 71 employed in the first embodiment is also employed here.

Average/minimum frequency measurement circuit 82 repeats measurement of the average frequency and the minimum frequency described in the first embodiment prescribed times, for example, 100 times.

Figure 5A:
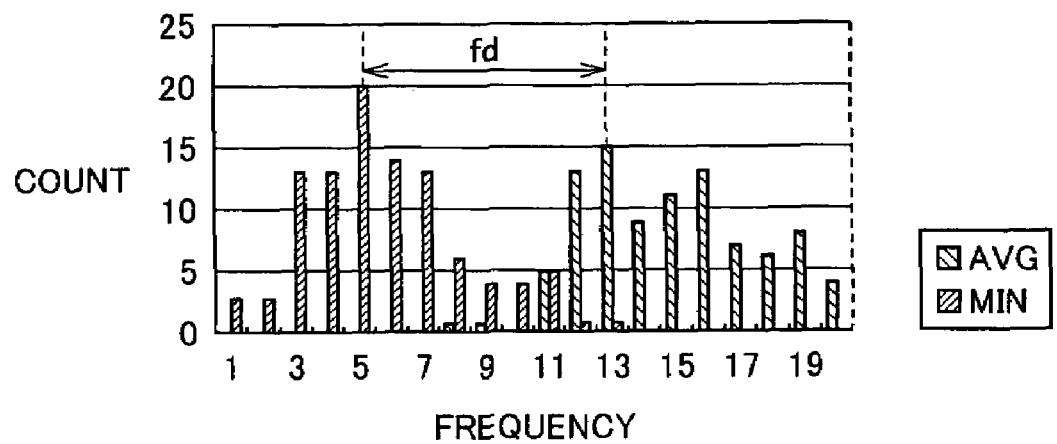
FIG. 5A shows one example of count distribution of an average frequency and a minimum frequency in a read-only optical disc.

FIG. 5A shows one example of count distribution of the average frequency and the minimum frequency in a read-only optical disc. As shown in FIG. 5A, as to the read-only optical disc, a crest of the average frequency and a crest of the minimum frequency exhibit gentle slopes respectively, and two crests are separate from each other. Therefore, when both of the average frequency and the minimum frequency are assumed as one variate, there are two low crests present.

Figure 5B:
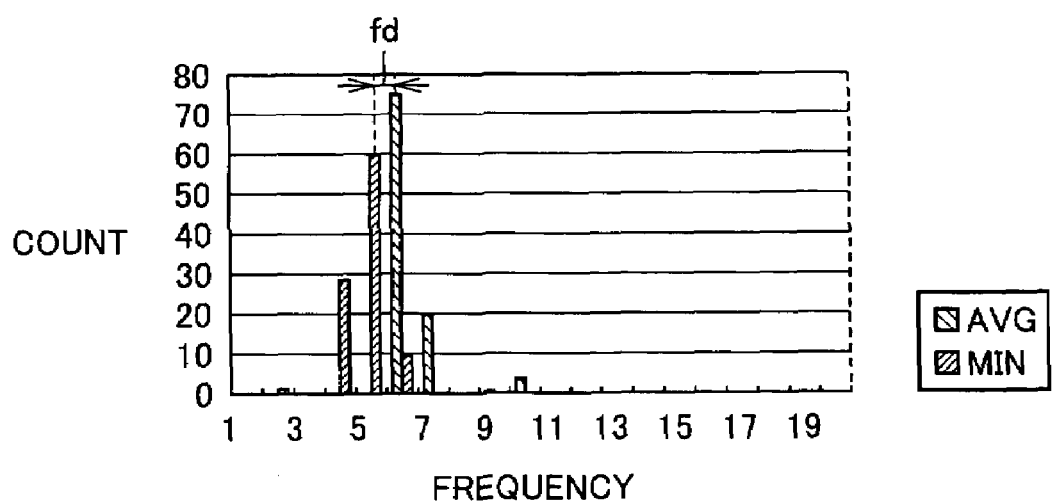
FIG. 5B shows one example of count distribution of the average frequency and the minimum frequency in a recordable optical disc.

FIG. 5B shows one example of count distribution of the average frequency and the minimum frequency in a recordable optical disc. As shown in FIG. 5B, as to the recordable optical disc, a crest of the average frequency and a crest of the minimum frequency exhibit steep slopes respectively, and two crests overlap with each other. Therefore, when both of the average frequency and the minimum frequency are assumed as one variate, there is one high crest present.

Standard deviation calculation circuit 83 assumes both of the average frequency and the minimum frequency as one variate X, and calculates a standard deviation $\sigma$ for 200 samples of variate X. In the example of FIGS. 5A and 5B, standard deviation $\sigma$ calculated with respect to the read-only optical disc is "35", while standard deviation $\sigma$ calculated with respect to the recordable optical disc is "7.2".

Determination circuit 84 determines that the optical disc to be reproduced is the read-only optical disc if standard deviation $\sigma$ is equal to or larger than a prescribed value, for example, not smaller than "20". On the other hand, determination circuit 84 determines that the optical disc to be reproduced is the recordable optical disc if standard deviation $\sigma$ is smaller than the prescribed value, for example, smaller than "20".

As described above, according to the optical disc reproduction apparatus in the present embodiment, even when a large amount of noise component is superposed on the tracking signal, whether the optical disc to be reproduced is the read-only optical disc or the recordable optical disc can be determined with high accuracy by repeating measurement prescribed times, of the average frequency and the minimum frequency of the output signal from the bandpass filter, assuming the measured average frequency and minimum frequency as one variate, and using the standard deviation of this variate.

The present invention is not limited to the embodiments above and encompasses variations as below, for example.

(1) Average frequency attaining a highest count and minimum frequency attaining a highest count In the second embodiment of the present invention, standard deviation calculation circuit 83 calculates the standard deviation of variate X, assuming the average frequency and the minimum frequency obtained by 100 times of measurement as one variate X, and determination circuit 84 determines a type of the optical disc to be reproduced based on the standard deviation. Meanwhile, the type of the optical disc may be determined by a method below, without using the standard deviation.

Here, a subtraction circuit specifies an average frequency fAve attaining the highest count and a minimum frequency fMin attaining the highest count, and subtracts minimum frequency fMin attaining the highest count from average frequency fAve attaining the highest count, so as to obtain a subtraction value fd as shown in FIG. 5. Then, the determination circuit determines that the optical disc to be reproduced is the read-only optical disc when subtraction value fd is equal to or larger than a prescribed value. On the other hand, the determination circuit determines that the optical disc to be reproduced is the recordable optical disc when subtraction value fd is smaller than the prescribed value.

(2) Measurement of the average frequency and the minimum frequency

The method of measuring the average frequency and the minimum frequency using average/minimum frequency measurement circuits 72, 82 in the embodiments of the present invention is by way of example, without limited thereto. In addition, reference value B used for binarization by average/minimum frequency measurement circuits 72, 82 may not be a constant value, but may vary in accordance with a situation.

(3) Tracking servo

In the embodiments of the present invention, disc determination is performed while tracking servo is turned on. The present invention, however, is not limited thereto, and disc determination may be performed while tracking servo is turned off.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disc reproduction apparatus determining whether an optical disc to be reproduced is a recordable optical disc having wobble formed or a read-only optical disc without wobble being formed, comprising:
   a bandpass filter receiving a tracking error signal;
   a measurement circuit measuring an average frequency and a minimum frequency of a signal output from said bandpass filter, wherein said measurement circuit measures an average frequency and a minimum frequency within a prescribed time period, of the output from said bandpass filter; and
   a first circuit determining whether the optical disc to be reproduced is a recordable optical disc or a read-only optical disc, based on measured said average frequency and said minimum frequency, wherein said first circuit includes:
   an operation circuit operating measured said average frequency and said minimum frequency, wherein said operation circuit subtracts said measured minimum frequency from said measured average frequency so as to obtain a subtraction value, and
   a determination circuit determining whether the optical disc to be reproduced is a recordable optical disc or a read-only optical disc based on a result of the operation, wherein said determination circuit determines the optical disc to be reproduced as a read-only optical disc when said subtraction value is not smaller than a prescribed value, and determines the optical disc to be reproduced as a recordable optical disc when said subtraction value is smaller than the prescribed value.

2. An optical disc reproduction apparatus determining whether an optical disc to be reproduced is a recordable optical disc having wobble formed or a read-only optical disc without wobble being formed, comprising:
   a bandpass filter receiving a tracking error signal;
   a measurement circuit measuring an average frequency and a minimum frequency of a signal output from said bandpass filter, wherein said measurement circuit repeats measurement prescribed times, of an average frequency and a minimum frequency of the signal output from said bandpass filter; and
   a first circuit determining whether the optical disc to be reproduced is a recordable optical disc or a read-only optical disc, based on measured said average frequency and said minimum frequency, wherein said first circuit includes:
   a subtraction circuit specifying an average frequency attaining a highest count among said average frequencies obtained by prescribed times of measurement and a minimum frequency attaining a highest count among the minimum frequencies obtained by prescribed times of measurement, and subtracting said minimum frequency attaining said highest count from said average frequency attaining said highest count so as to calculate a subtraction value, and
   a determination circuit determining the optical disc to be reproduced as a read-only optical disc when said subtraction value is not smaller than a prescribed value, and determining the optical disc to be reproduced as a recordable optical disc when said subtraction value is smaller than the prescribed value.

3. An optical disc reproduction apparatus determining whether an optical disc to be reproduced is a recordable optical disc having wobble formed or a read-only optical disc without wobble being formed, comprising:
   a bandpass filter receiving a tracking error signal;
   a measurement circuit measuring an average frequency and a minimum frequency of a signal output from said bandpass filter, wherein said measurement circuit repeats measurement prescribed times, of an average frequency and a minimum frequency of the signal output from said bandpass filter; and
   a first circuit determining whether the optical disc to be reproduced is a recordable optical disc or a read-only optical disc, based on measured said average frequency and said minimum frequency, wherein said first circuit includes:
   an operation circuit assuming said average frequency and said minimum frequency obtained by prescribed times of measurement as one variate and calculating a standard deviation of the variate, and
   a determination circuit determining the optical disc to be reproduced as a read-only optical disc when said standard deviation is not smaller than a prescribed value, and determining the optical disc to be reproduced as a recordable optical disc when said standard deviation is smaller than the prescribed value.

* * * * *